(12) United States Patent
Mimura

(10) Patent No.: US 6,249,643 B1
(45) Date of Patent: *Jun. 19, 2001

(54) IMAGE SENSING APPARATUS HAVING PHOTOELECTRIC ELEMENTS IN A TWO-DIMENSIONAL OFFSET ARRANGEMENT

(75) Inventor: Toshihiko Mimura, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/267,292

(22) Filed: Jun. 28, 1994

Related U.S. Application Data

(63) Continuation of application No. 07/978,187, filed on Nov. 17, 1992, now abandoned, which is a continuation of application No. 07/503,292, filed on Apr. 2, 1990, now abandoned.

(30) Foreign Application Priority Data

Apr. 10, 1989 (JP) .................................. 1-089919

(51) Int. Cl.$^7$ ..................................... H04N 5/91
(52) U.S. Cl. ................ 386/107; 358/335; 358/906; 358/370; 358/909.1; 360/33.1; 360/35.1; 360/32
(58) Field of Search .................... 358/335, 906, 358/310, 909.1; 360/33.1, 35.1, 32; 386/46, 107, 117, 1, 30, 73, 124

(56) References Cited

U.S. PATENT DOCUMENTS

| | | | |
|---|---|---|---|
| 4,757,390 | * 7/1988 | Mehrgardt et al. | 358/310 |
| 4,843,457 | * 6/1989 | Yamagata | 358/314 |
| 4,868,654 | * 9/1989 | Juri et al. | 358/133 |
| 4,974,065 | * 11/1990 | Murakami et al. | 358/31 |
| 5,093,798 | * 3/1992 | Kita | 364/518 |
| 5,260,837 | * 11/1993 | Lemelson | 358/906 |

* cited by examiner

Primary Examiner—Huy Nguyen
(74) Attorney, Agent, or Firm—Robin, Blecker & Daley

(57) ABSTRACT

In a recording and reproducing apparatus having an image sensor which has photoelectric conversion elements arranged in a two-dimensionally offset manner and a signal processing part which is arranged to include a two-dimensional filter and a frame memory, a circuit is arranged to enable the two-dimensional filter which forms a luminance signal in recording to be used also for reproduction; and a sampling action for a reproducing operation is arranged to be performed in the form of sub-sampling for every field.

6 Claims, 5 Drawing Sheets

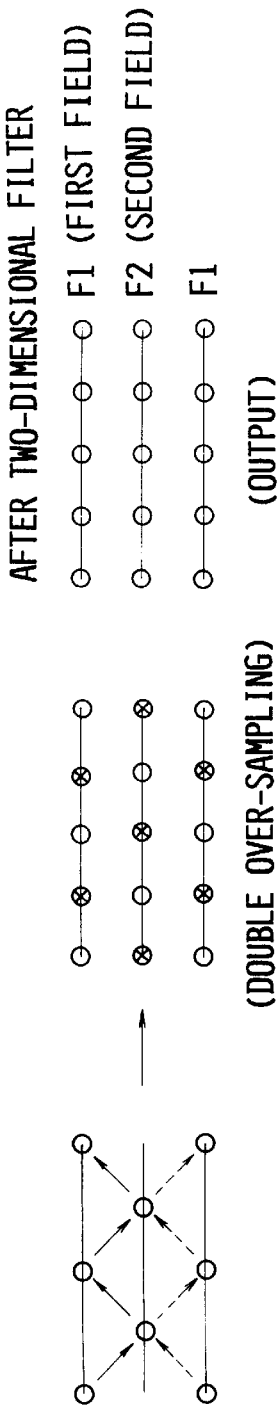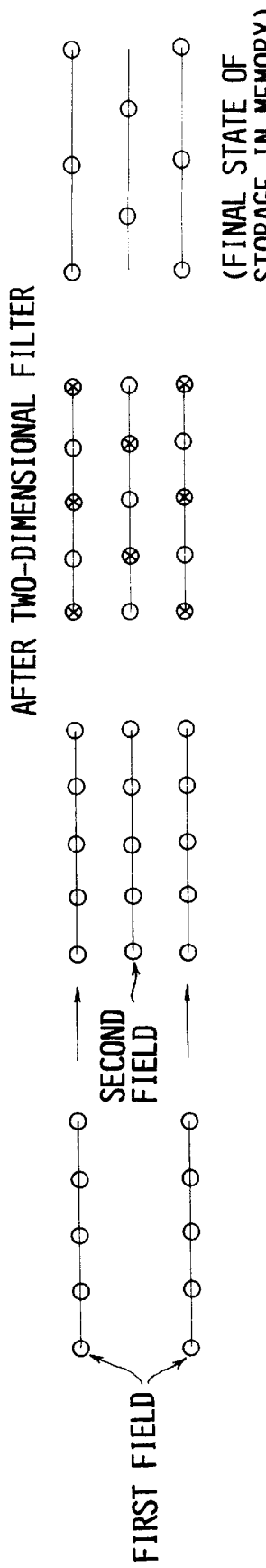

IMAGE SENSING APPARATUS HAVING PHOTOELECTRIC ELEMENTS IN A TWO-DIMENSIONAL OFFSET ARRANGEMENT

This is a continuation application under 37 CFR 1.62 of prior application Ser. No. 07/978,187 filed Nov. 17, 1992 (abandoned) which is a cont. of Ser. No. 07/503,292 filed Apr. 2, 1990 (abandoned).

BACKGROUND OF THE INVENTION

1. Field of the Invention

This invention relates to a recording and reproducing apparatus and more particularly to a recording and reproducing apparatus having a solid-state image sensor in which picture elements are arranged in an offset manner.

2. Description of the Related Art

The known recording and reproducing apparatuses of the kind having a solid-state image sensor include a VHS type, an 8-mm video type, an electronic still camera, etc. In the early stage of employment of the solid-state image sensor, the photosensitive part of the image sensor was formed by regularly arranging light receiving elements (or picture elements) of a square or rectangular shape in a matrix-like state. However, a demand for a higher picture quality increased. In answer to it, efforts have been made to enhance the picture quality of the solid-state image sensor. As a result, a new method of arranging the image sensor has recently been developed. According to this method, each of the picture elements is formed in a polygonal shape such as a rhombic or hexagonal shape and they are arranged with their centroids two-dimensionally offset in a so-called offset sub-Nyquist sampling structure. The picture quality can be improved by preventing the shrinkage (a decrease in sensitivity) of the light receiving area of the image sensor by this method.

However, like in the case of the image sensor which is arranged as shown in FIG. 2(a), a moiré would take place if a TV signal is formed by reading the signal in a zigzag manner in the horizontal direction as indicated by full- and broken-line arrows in FIG. 2(a). To solve this problem, the TV signal must be interpolated with signals of offset picture element parts, which are, for example, points indicated by square marks if points indicated by circular marks are arranged to be sampling points. It is also necessary to provide the image sensor with a two-dimensional filter having a large signal processing part for the purpose of limiting the frequency band of the signal in the horizontal direction. Further, for the above-stated interpolation process, a frame memory is arranged to temporarily store the output of the image sensor by offset-sub-Nyquist-sampling the output.

As mentioned above, in the above-stated example of the prior art arrangement, the frame memory is arranged to temporarily store the output of the image sensor for the interpolating process. Meanwhile, an image recording and reproducing apparatus is generally provided with a frame memory which is arranged to temporarily store a reproduced signal for the purpose of processing in a given manner the reproduced signal obtained from a recording medium or for performing a special reproducing operation. It is, therefore, preferable to arrange one and the same frame memory to serve both the above-stated different purposes. However, in storing the reproduced signal, a signal obtained by sampling in an ordinary manner is stored. Therefore, in order to enable the frame memory which is arranged to temporarily store the offset-sub-Nyquist-sampled output of the image sensor to be capable of storing also the ordinary reproduced signal, the frame memory must be arranged to store the signal with the same degree of horizontal resolution as the reproduced-signal-storing frame memory. In this instance, a larger storage capacity is required for reproduction than for image sensing.

The storage capacity for reproduction can be reduced to about the same capacity required for image sensing by arranging the frame memory to store an offset-sub-Nyquist-sampled signal also in reproducing. However, such an arrangement requires a two-dimensional filtering process also for reproduction as well as for image sensing. This necessitates circuit arrangement on a larger scale.

SUMMARY OF THE INVENTION

It is, therefore, an object of this invention to provide a recording and reproducing apparatus which is capable of solving the above-stated problem.

In a recording and reproducing apparatus arranged according to this invention and having an image sensor which includes a photosensitive part consisting of photo-electric conversion elements of two-dimensionally offset structural arrangement and a signal processing part which includes a two-dimensional filter and a frame memory, a circuit is arranged to enable the two-dimensional filter which forms a luminance signal in recording to be used also for reproduction and a sampling action for reproduction is arranged to be performed in the form of sub-sampling for every field.

The above-stated embodiment is capable of using the two-dimensional filter of the signal processing part both for recording and reproduction. Therefore, the frame memory can be used not only for recording but also for reproduction with the storage capacity of the memory set at the smaller storage capacity required for recording.

The above and other objects and features of the invention will become apparent from the following detailed description of embodiments thereof taken in connection with the accompanying drawings.

BRIEF DESCRIPTION OF THE DRAWINGS

FIGS. 5(a) to 5(c) show the signal processing action of the embodiment of FIG. 4 performed in image sensing and recording.

FIGS. 6(a) to 6(d) show the signal processing action of the same embodiment performed for reproduction.

DETAILED DESCRIPTION OF THE PREFERRED EMBODIMENTS

An embodiment of this invention is described below with reference to the accompanying drawings.

Figure 1:
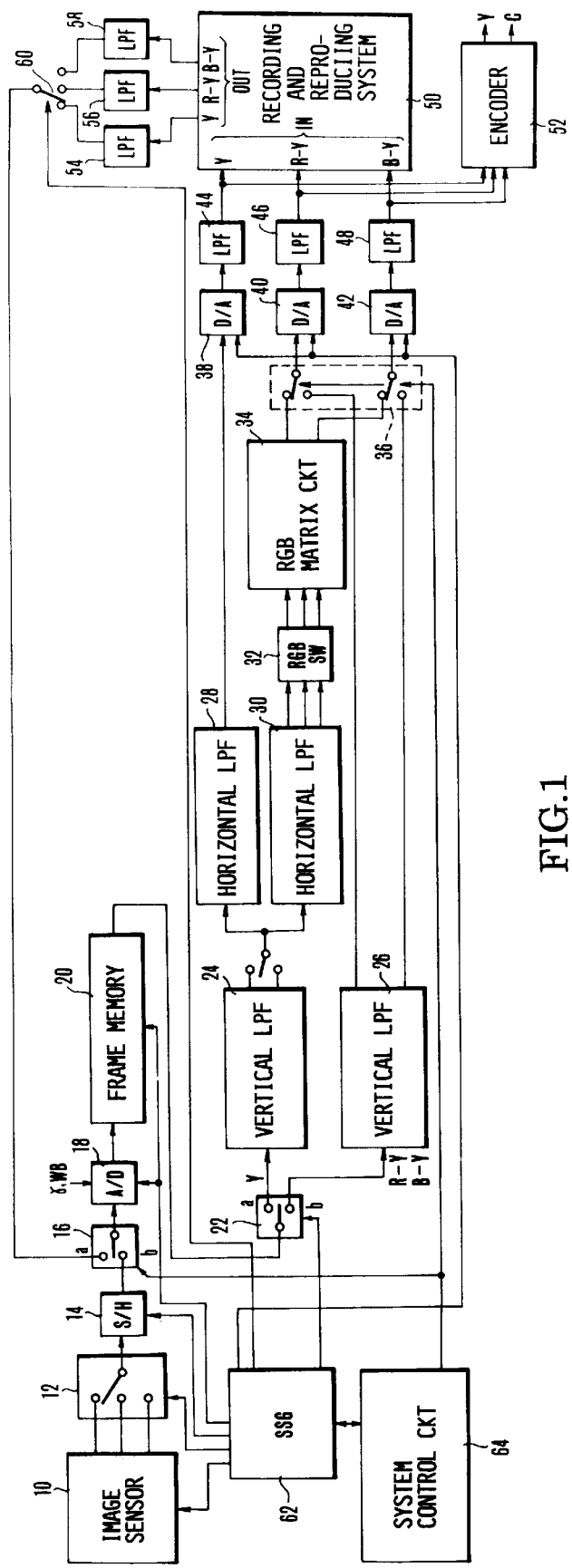
FIG. 1 is a block diagram showing the arrangement of an embodiment of this invention.
Figure 2A:
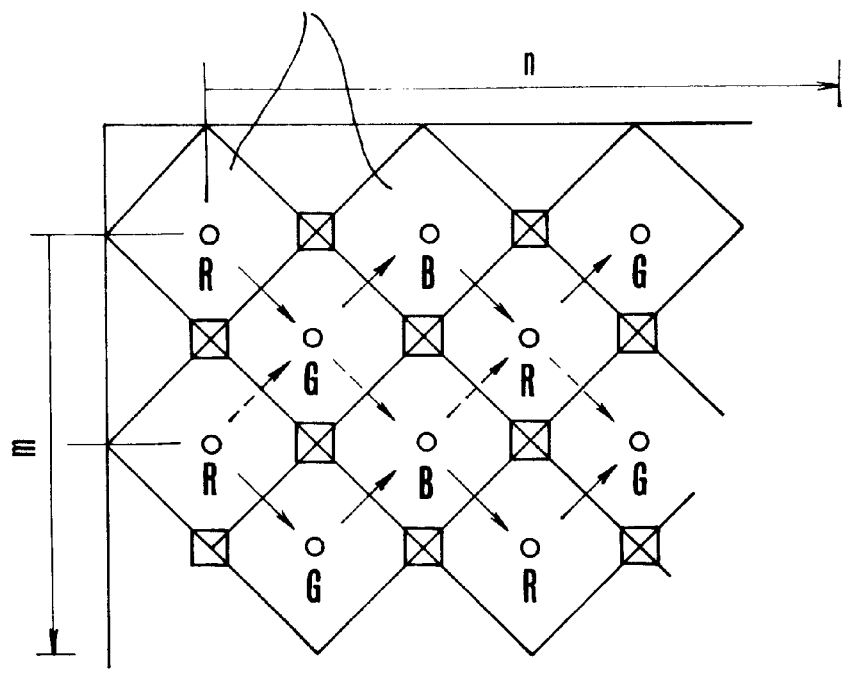
FIGS. 2(a) and 2(b) show the picture element arrangement of the photo-sensitive part of an image sensor.
Figure 2B:
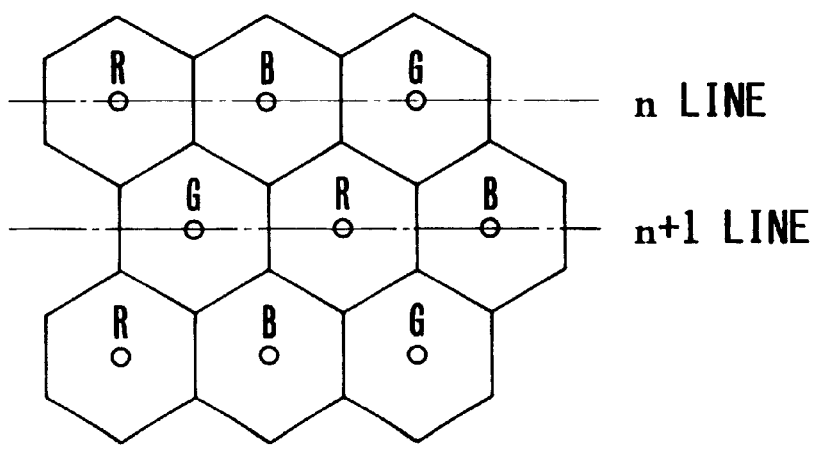

FIG. 1 shows in a block diagram the arrangement of the embodiment of this invention. An image sensor 10 has a photosensitive part consisting of light receiving elements which are arranged in an offset sub-Nyquist sampling structural arrangement as shown in FIG. 2(a). The image sensor 10 is thus arranged to produce three color signals R, G and B. A switch 12 is arranged to form a signal corresponding to a luminance signal by serially selecting the three outputs of the image sensor 10, for example, in the order of the arrows as shown in FIG. 2(a). The embodiment comprises a sample-and-hold (hereinafter abbreviated as S/H) circuit 14, a selection switch 16, an analog-to-digital (abbreviated as A/D) converter 18, which is arranged to have a white balance adjusting function and a gamma correcting function, a frame memory 20, a switch 22 which is arranged to separate a luminance signal and a chrominance signal from each other during a reproducing operation, vertical low-pass (abbreviated as LPF) filters 24 and 26, a horizontal LPF 28 for the luminance signal, a horizontal LPF 30 for the chrominance signals, a switch 32 which is provided for rearrangement of the color signals R, G and B, and an RGB matrix circuit 34.

A change-over circuit 36 is arranged to select a signal coming through the vertical LPF 24 and the horizontal LPF 30 and a signal coming through the vertical LPF 26. The embodiment further comprises digital-to-analog (abbreviated as D/A) converters 38, 40 and 42. LPFs 44, 46 and 48 are arranged to remove the high-frequency components from the outputs of the D/A converters 38, 40 and 42. A recording and reproducing system 50 is arranged to record an input signal on a recording medium and to reproduce a signal record from the medium. An encoder 52 is arranged to form luminance and chrominance signals in conformity to a given system from the output of each of the LPFs 44, 46 and 48. LPFs 54, 56 and 58 are arranged to limit the frequency band of the output (reproduced signal) of the recording and reproducing system 50. A switch 60 is arranged to form, from the outputs of the LPFs 54, 56 and 58, a signal for inter-field offset sub-Nyquist sampling. The embodiment further comprises a sync signal generating circuit (abbreviated as SSG) 62 and a system control circuit 64 which is arranged to perform overall control for the embodiment.

The image-sensing and recording operation of the embodiment is performed in the following manner. In this case, the connecting position of the switch 16 is on the side of a contact "b". The output of the image sensor 10 is supplied via the switch 12, the S/H circuit 14, the switch 16 and the A/D converter 18 to the frame memory 20 to be stored there. The connecting position of the switch 22 is on the side of a contact "a". This allows the stored signal of the frame memory 20 to be formed into a luminance signal by the horizontal LPF 28 through the vertical LPF 24 and into color-difference signals R-Y and B-Y by the horizontal LPF 30, the RGB switch 32 and the RGB matrix circuit 34. The change-over circuit 36 is connected to the output side of the RGB matrix circuit 34. The luminance signal is obtained from the D/A converter 38 and the chrominance signal from the D/A converters 40 and 42. The high-frequency components of the outputs of the D/A converters 38, 40 and 42 are removed by the LPFs 44, 46 and 48. The outputs of the LPFs 44, 46 and 48 are supplied to the Y, R-Y and B-Y input terminals of the recording and reproducing system 50 to be recorded on a recording medium which is not shown.

Figure 3:
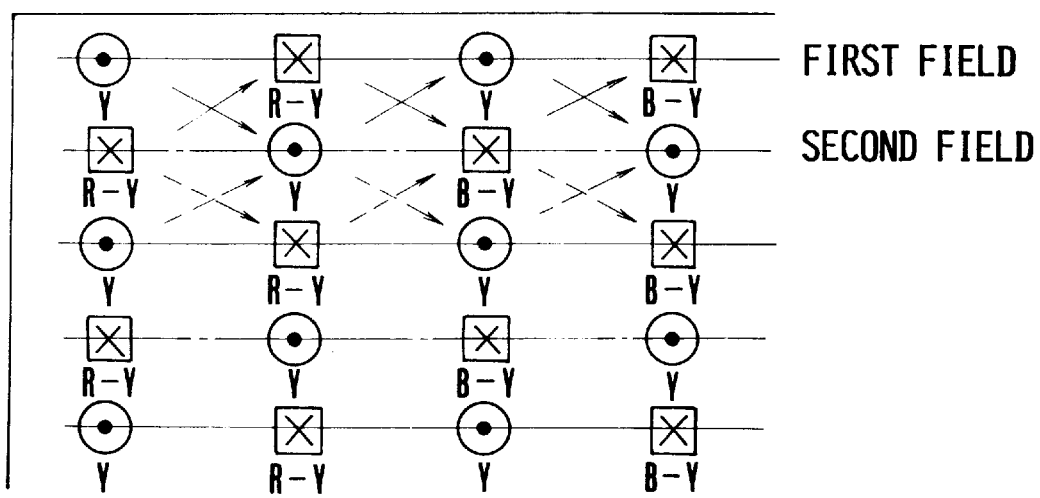
FIG. 3 shows the reading sequence of an image sensor 10 shown in FIG. 1.

The reproducing operation of the embodiment is performed in the following manner. Aliasing noises of A/D conversion are removed by the LPFs 54, 56 and 58. Jitters occurring during recording and reproduction are also removed. The luminance signal and the color-difference signals are inter-field-offset-sampled by means of the switch 60 as shown in FIG. 3. During this process, the connecting position of the switch 16 is on the side of a contact "a" thereof. The output of the switch 60 is supplied to the A/D converter 18. The output of the A/D converter 18 is temporarily stored by the frame memory 20. For a first field, the signals stored in the frame memory 20 are read out in the order of the luminance signal, color-difference signals, luminance signal, color-difference signals, as indicated by full line arrows in FIG. 3. For a second field, the signals are read out in the order of broken line arrows as shown in FIG. 3. The signal thus read out in a time-sharing manner is divided into the luminance signal and the color-difference signals by means of the switch 22. They are allotted to the vertical LPFs 24 and 26. The luminance signal is supplied through the vertical LPF 24 and the horizontal LPF 28 to the D/A converter 38 to be converted into an analog signal. The color-difference signals are supplied through the vertical LPF 26 and the change-over circuit 36 to the D/A converters 40 and 42. The LPFs 44, 46 and 48 remove high-frequency components from the outputs of the D/A converters 38, 40 and 42 respectively. The encoder 52 forms from the outputs of these LPFs 44, 46 and 48 a luminance signal Y and a chrominance signal C conforming to a given system.

In the case of the embodiment described, the recording and reproducing system is described by way of example as arranged to simultaneously process the color-difference signals. However, the invention is of course likewise applicable to a recording and reproducing system of the kind arranged to line-sequentially process the color-difference signals. Further, assuming that an image signal which is obtained by an image sensor having the picture elements of its photosensitive part arranged in a square lattice sampling structure and is recorded on a recording medium in a state of retaining its spectrum intact in the oblique direction thereof, if the recording and reproducing system 50 is loaded with the recording medium for reproduction, there arise aliasing noises in a small degree. However, in most cases, the aliasing noises are weakened to an inconspicuous state by the deterioration of the frequency characteristic caused by the image sensing system and the recording and reproducing system and also by the characteristic of an optical LPF.

Figure 4:
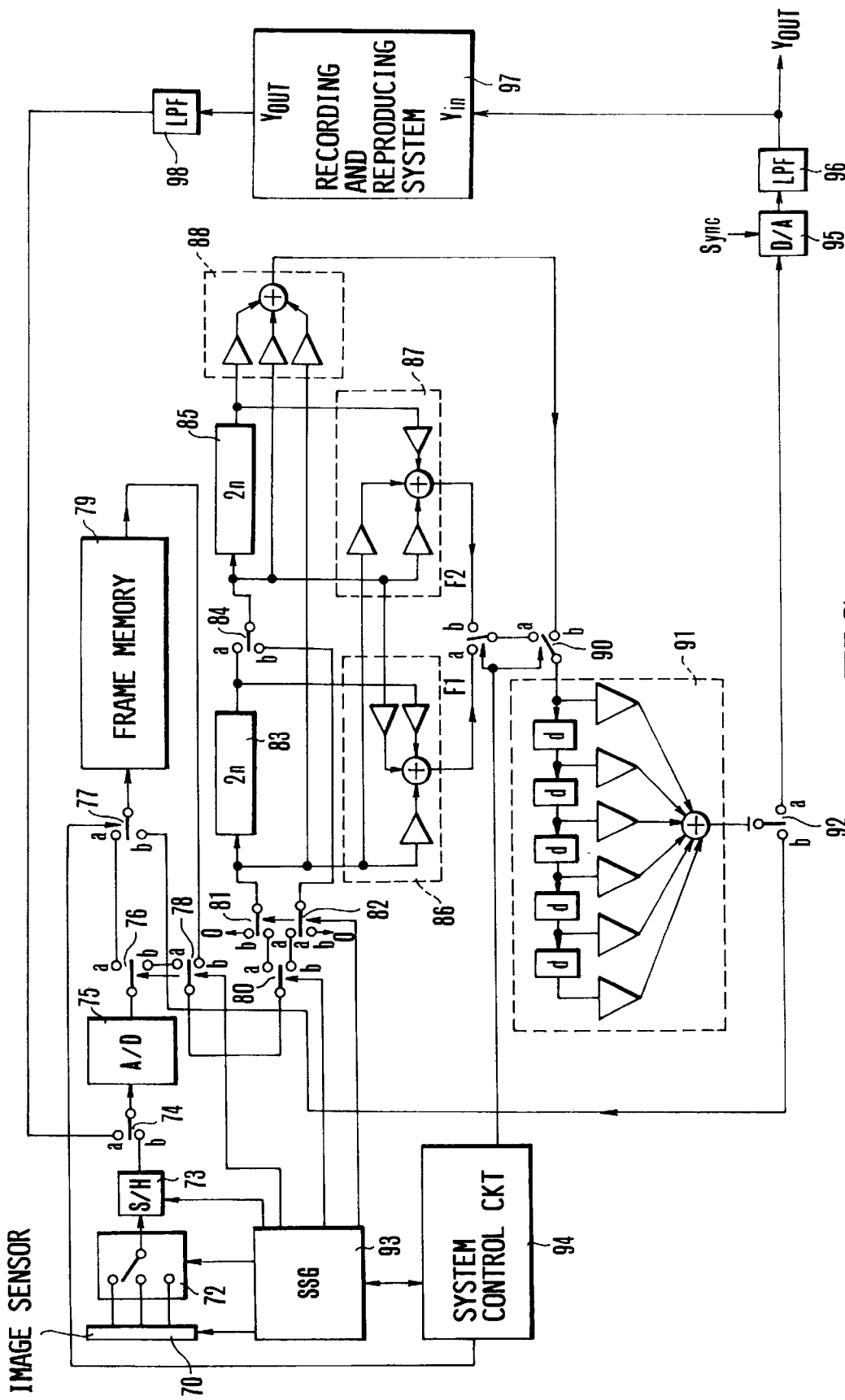
FIG. 4 is a block diagram showing the arrangement of another embodiment of the invention.

FIG. 4 shows in a block diagram the arrangement of a second embodiment of the invention. The illustration is simplified by showing only the luminance signal processing part of the arrangement. The two-dimensional filter of the second embodiment is arranged to be consisting of 3×6 filters. However, this invention is not limited to the use of the filter of that kind.

In image sensing and recording, the connecting positions of switches 74, 78 and 84 are on the side of their contacts "b" while those of the other switches 76, 77, 90 and 92 are on the side of their contacts "a". An image sensor 70 has a photosensitive part which is of the same offset sub-Nyquist sampling structure as in the case of the image sensor 10 of FIG. 1. Signals are read out from the image sensor 70 by a switch 72 in a zigzag manner as indicated by arrows in FIG. 5(a). The output of the switch 72 is sampled and held by an S/H circuit 73. The output of the S/H circuit 73 is gamma-corrected (and white-balance-adjusted in a case where a chrominance signal is also processed) by an A/D converter 75. The output of the A/D converter 75 is stored by a frame memory 79. A signal read out from the frame memory 79 is supplied via the switch 78 to a switch 80 to be separated into signals for different fields by the switch 80. The signals thus separated are double-over-sampled as shown in FIG. 5(b). The over-sampled signals are supplied to line memories 83 and 85. The outputs of these line memories are equivalently subjected to a two-dimensional filtering process performed by vertical LPFs 86 and 87 and a horizontal LPF 91 as shown in FIG. 5(*c*). The output of the horizontal LPF 91 is then converted into an analog signal by a D/A converter 95. The analog signal is supplied via a LPF 96 to a recording and reproducing system 97 to be recorded on a recording medium. The recording and reproducing system 97 also has a LPF 98 which supplies a signal to switch 74. The embodiment further comprises a SSG 93 and a system control circuit 94 which is arranged to perform overall control for the embodiment.

The reproducing operation of the second embodiment is performed in the following manner. The connecting positions of the switches 74, 76 and 77 are first set on the side of their contacts "a". The signal of the first field is alone double-over-sampled and is then stored by the frame memory 79. In the memory 79, picture elements for the first field are arranged as shown in FIG. 6(*a*). Next, the connecting positions of the switches 76, 77, 90 and 92 are set on the side of their contacts "b" and those of switches 80, 81, 82 and 84 on the side of their contacts "a". Interlace scanning lines for the first and second fields are formed as shown in FIG. 6(*b*) by switching the position of the switch 78 from one contact over to the other. The signal thus output from the switch 78 is subjected to an equivalent two-dimensional filtering process (pre-filter) which is performed by the vertical LPF 88 and the horizontal LPF 91. By this, jitters are removed. FIG. 6(*c*) shows the allocation of picture elements obtained after the two-dimensional filtering process. A signal indicated by marks x in FIG. 6(*c*) is taken out by means of the switch 92. After that, the writing action on the frame memory 79 is resumed to store the sub-Nyquist-sampled data in the frame memory 79.

In the event of conversion into a TV signal, the data is read out from the memory 79 in the same manner as in the case of the image signal and is then interpolated through the two-dimensional filter.

In the case of the second embodiment, the two-dimensional filtering process is performed for the offset sub-Nyquist sampling even in the event of reproduction freezing. A signal which is recorded by some other recording apparatus without any sub-Nyquist sampling process can be reproduced by the second embodiment with almost no picture quality deterioration caused by aliasing. Further, the memory 79 can be arranged in a small size as it is required to have only a small storage capacity required for sub-Nyquist sampling.

As apparent from the foregoing description, in accordance with this invention, the storage capacity of the memory for temporarily storing the image signal can be reduced. In addition to that, one and the same two-dimensional filter can be used in common for the different purposes mentioned in the foregoing. The invention, therefore, enhances the efficiency of the use of these component parts to the size of the circuit arrangement from increasing.

What is claimed is:

1. An image sensing apparatus, comprising:

(a) image sensing means including a plurality of photo-electric converting elements for converting image light coming from an object to be photographed into an electric image signal, said photo-electric converting elements being arranged in two-dimensional offset sub-sampling structure arrangement;

(b) common memory means for storing an output of said image sensing means;

(c) two dimensional low-pass filter means for interpolating the image signal stored in common memory means in a vertical direction and in a horizontal direction and for producing an interpolated image signal;

(d) recording or reproducing means for recording said interpolated image signal produced by said two dimensional low-pass filter means on a recording medium or reproducing a recorded interpolated image signal from said recording medium;

(e) offset-subsampling means for offset-subsampling the reproduced interpolated image signal reproduced by said recording or reproducing means to thin out said interpolated image signal; and (f) switch means for selectively supplying the output of said image sensing means and an output of said offset-subsampling means to said common memory means.

2. An image sensing apparatus according to claim 1, wherein said common memory means has a capacity for storing the image signal for one frame from said image sensing means.

3. An image sensing apparatus according to claim 1, wherein said offset-subsampling means includes a switch circuit.

4. An image sensing apparatus according to claim 1, wherein said offset-subsampling means performs a two-dimensional offset sub-sampling.

5. An image sensing apparatus according to claim 1, wherein said two dimensional low-pass filter means performs interpolation.

6. An image sensing apparatus according to claim 1, wherein said reproduced signal is supplied to said two dimensional low-pass filter means to reduce the data amount of said image signal.

* * * * *

UNITED STATES PATENT AND TRADEMARK OFFICE
CERTIFICATE OF CORRECTION

PATENT NO. : 6,249,643 B1
DATED : June 19, 2001
INVENTOR(S) : Toshihiko Mimura

It is certified that error appears in the above-identified patent and that said Letters Patent is hereby corrected as shown below:

Title page,
Delete the original title "IMAGE SENSING APPARATUS HAVING PHOTOELECTRIC ELEMENTS IN A TWO-DIMENSIONAL OFFSET ARRANGEMENT" and insert -- IMPROVED IMAGE SENSING APPARATUS HAVING PHOTOELECTRIC ELEMENTS IN A TWO-DIMENSIONAL OFFSET ARRANGEMENT --.

Column 1,
Line 1, before "IMAGE" insert -- IMPROVED --.
Line 41, delete "full-" and insert -- full --.

Column 2,
Line 24, before "two-dimensionally" insert -- a --.

Column 5,
Line 4, before "LPF" delete "a" and insert -- an --.

Signed and Sealed this

Twenty-fifth Day of December, 2001

Attest:

*Attesting Officer*

JAMES E. ROGAN
*Director of the United States Patent and Trademark Office*